US011282187B2

(12) United States Patent
Nakashige et al.

(10) Patent No.: US 11,282,187 B2
(45) Date of Patent: Mar. 22, 2022

(54) INSPECTION SYSTEM, INSPECTION APPARATUS, AND METHOD USING MULTIPLE ANGLE ILLUMINATION

(71) Applicant: RICOH COMPANY, LTD., Tokyo (JP)

(72) Inventors: Fumihiro Nakashige, Kanagawa (JP); Takuji Kamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/986,836

(22) Filed: Aug. 6, 2020

(65) Prior Publication Data

US 2021/0056679 A1 Feb. 25, 2021

(30) Foreign Application Priority Data

Aug. 19, 2019 (JP) .............................. JP2019-150044
Jul. 30, 2020 (JP) .............................. JP2020-128955

(51) Int. Cl.
*G06T 7/00* (2017.01)
*G01N 21/88* (2006.01)
*G01N 21/89* (2006.01)

(52) U.S. Cl.
CPC ........ *G06T 7/0004* (2013.01); *G01N 21/8803* (2013.01); *G01N 21/8806* (2013.01);
(Continued)

(58) Field of Classification Search
CPC .............. G06T 7/0004; G01N 21/8803; G01N 21/8806; G01N 21/8901; G01N 2021/8812; G01N 2021/8887; G01N 2021/8835

(Continued)

(56) References Cited

U.S. PATENT DOCUMENTS 4,943,713 A * 7/1990 Yoshida .................... B08B 9/46
250/223 B
5,032,735 A * 7/1991 Kobayashi ........... G01R 31/309
250/559.34
(Continued)

FOREIGN PATENT DOCUMENTS

EP   1 116 950 A1   7/2001
JP   2000-028536    1/2000
(Continued)

OTHER PUBLICATIONS

Extended European Search Report dated Jan. 19, 2021 in European Patent Application No. 20190723.5, 8 pages.

*Primary Examiner* — Roy M Punnoose
(74) *Attorney, Agent, or Firm* — Xsensus LLP

(57) ABSTRACT

An inspection system for inspecting a target includes a first lighting device configured to irradiate light onto the target from a given direction; a second lighting device, provided between the target and the first lighting device, configured to irradiate light onto the target from an oblique direction with respect to the given direction; an image capture device, provided at a position opposite to a position of the target with respect to the first lighting device and the second lighting device in the given direction; and circuitry configured to acquire a first inspection target image of the target, captured by the image capture device by irradiating the light from the first lighting device, and a second inspection target image of the target, captured by the image capture device by irradiating the light from the second lighting device, to be used for inspecting the target.

14 Claims, 12 Drawing Sheets

(52) U.S. Cl.
CPC . *G01N 21/8901* (2013.01); *G01N 2021/8812* (2013.01); *G01N 2021/8887* (2013.01)

(58) Field of Classification Search
USPC ........................................................ 382/141
See application file for complete search history.

(56) References Cited

U.S. PATENT DOCUMENTS

| | | | | |
|---|---|---|---|---|
| 5,039,868 | A * | 8/1991 | Kobayashi | G01N 21/95684 250/559.08 |
| 5,072,127 | A * | 12/1991 | Cochran | H04N 7/18 250/559.39 |
| 5,095,204 | A * | 3/1992 | Novini | G01N 21/9045 250/223 B |
| 5,166,985 | A * | 11/1992 | Takagi | G01N 21/95684 382/150 |
| 5,245,671 | A * | 9/1993 | Kobayashi | G01N 21/8806 382/150 |
| 5,267,217 | A * | 11/1993 | Tokura | G01B 11/24 356/237.1 |
| 5,822,449 | A * | 10/1998 | Kobayashi | G05B 19/41805 382/141 |
| 6,017,133 | A * | 1/2000 | Grasmuller | G01N 21/8806 382/147 |
| 6,122,048 | A * | 9/2000 | Cochran | G01N 21/8806 250/223 B |
| 6,166,393 | A * | 12/2000 | Paul | G01N 21/8806 250/559.08 |
| 6,542,236 | B1 * | 4/2003 | Kim | H05K 13/0815 356/394 |
| 6,795,176 | B1 * | 9/2004 | Tennakoon | B07C 5/34 250/223 B |
| 6,947,151 | B2 * | 9/2005 | Fujii | G01N 21/8806 356/237.1 |
| 6,983,066 | B2 * | 1/2006 | Mahon | G01N 21/8806 382/141 |
| 7,394,084 | B2 * | 7/2008 | Kuriyama | G01N 21/8806 250/559.34 |
| 7,557,920 | B2 * | 7/2009 | Lebens | G01N 21/21 356/394 |
| 10,451,547 | B2 * | 10/2019 | Ser | G01N 21/4738 |
| 2002/0114505 | A1 * | 8/2002 | Mahon | G01N 21/95684 382/145 |
| 2004/0012819 | A1 | 1/2004 | Nakashige et al. | |
| 2004/0151519 | A1 | 8/2004 | Nakashige | |
| 2004/0175027 | A1 * | 9/2004 | Mahon | G01N 21/8806 382/141 |
| 2005/0084148 | A1 | 4/2005 | Miranda et al. | |
| 2005/0190361 | A1 * | 9/2005 | Ishiba | G01N 21/95684 356/237.2 |
| 2006/0000989 | A1 * | 1/2006 | Kuriyama | G01N 21/8806 250/559.34 |
| 2006/0075631 | A1 * | 4/2006 | Case | H05K 13/0812 29/709 |
| 2006/0171742 | A1 | 8/2006 | Nakashige | |
| 2008/0013820 | A1 * | 1/2008 | Vertoprakhov | G06T 3/0043 382/141 |
| 2012/0113443 | A1 | 5/2012 | Itoh et al. | |
| 2017/0270359 | A1 | 9/2017 | Ouchi et al. | |
| 2017/0272613 | A1 | 9/2017 | Kamada et al. | |
| 2018/0209904 | A1 | 7/2018 | Itoh et al. | |
| 2018/0211106 | A1 | 7/2018 | Kamada et al. | |
| 2019/0149695 | A1 | 5/2019 | Kamada | |

FOREIGN PATENT DOCUMENTS

| | | |
|---|---|---|
| JP | 2000-163582 A | 6/2000 |
| JP | 2000-275869 | 10/2000 |
| JP | 2002-501265 | 1/2002 |
| JP | 2006-285763 | 10/2006 |
| JP | 2011-239926 | 12/2011 |
| JP | 2019-124640 A | 7/2019 |
| WO | WO99/038121 A1 | 7/1999 |
| WO | WO 2011/055397 A1 | 5/2011 |

* cited by examiner

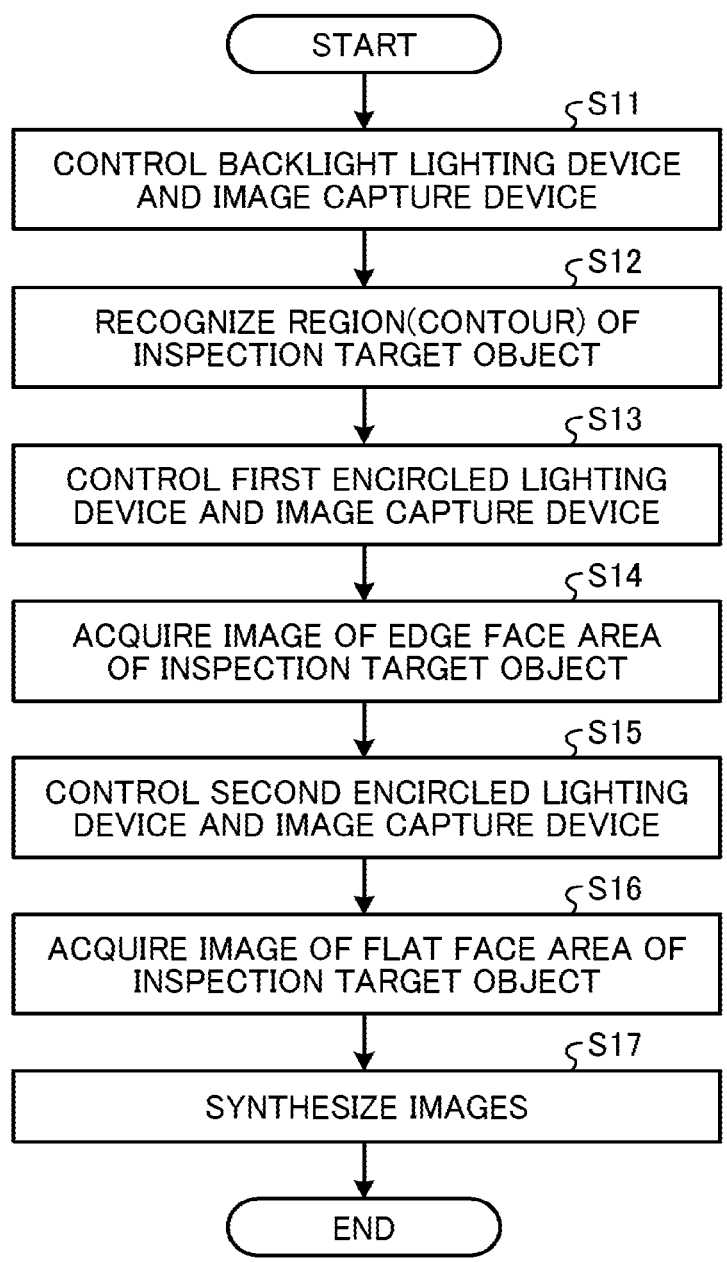

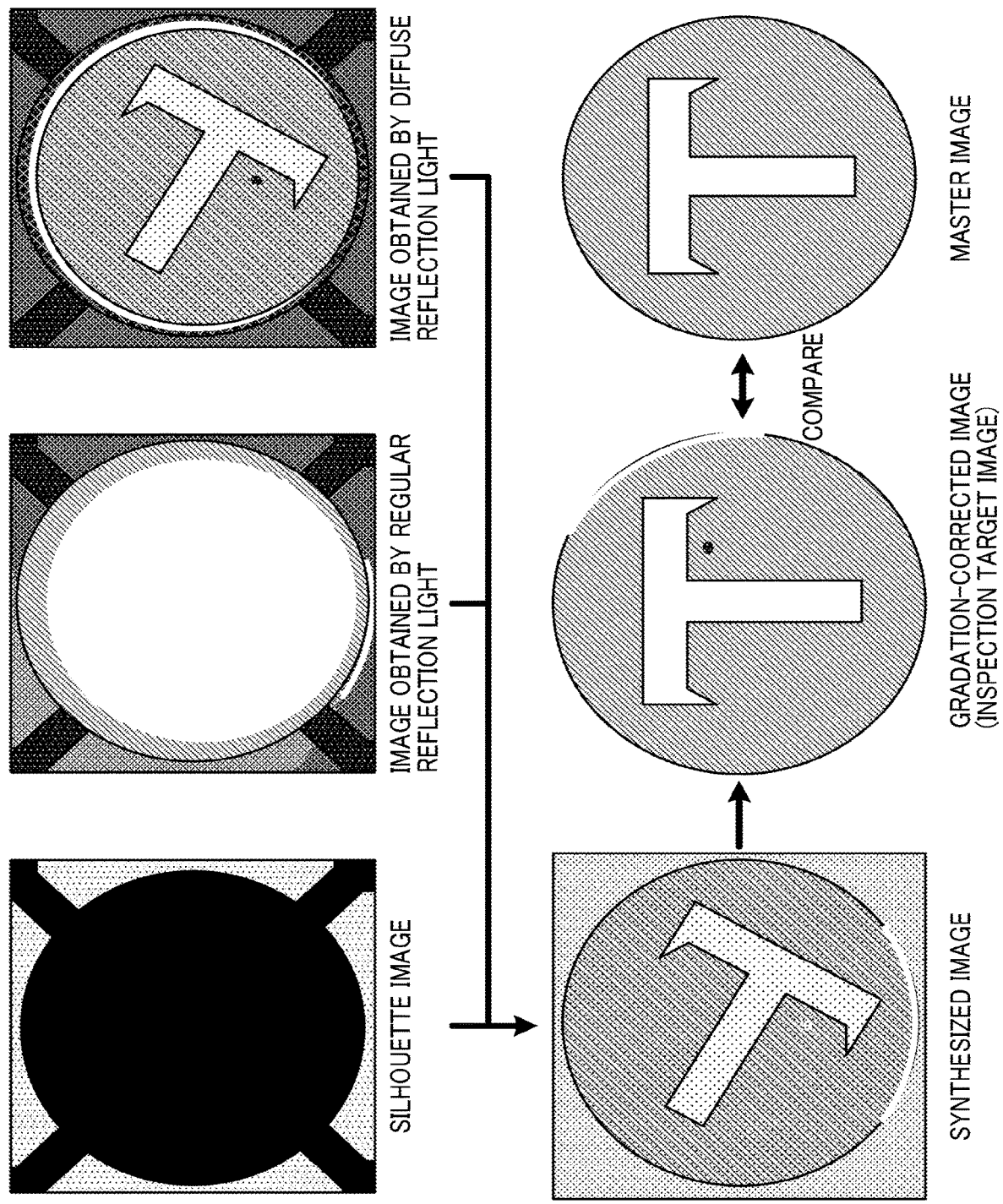

INSPECTION SYSTEM, INSPECTION APPARATUS, AND METHOD USING MULTIPLE ANGLE ILLUMINATION

CROSS-REFERENCE TO RELATED APPLICATION

This application claims priority pursuant to 35 U.S.C. § 119(a) to Japanese Patent Application Nos. 2019-150044, filed on Aug. 19, 2019 and 2020-128955, filed on Jul. 30, 2020 in the Japan Patent Office, the disclosure of which are incorporated by reference herein in its entirety.

BACKGROUND

Technical Field

This disclosure relates to an inspection system, an inspection apparatus, and an inspection method.

Background Art

Inspection apparatuses that inspect objects by illuminating light onto the objects and capturing images of the objects using imaging camera are known. For example, a technique of using a plurality of light sources to create multiple images of an object (inspection target object) is disclosed. Further, a technique of acquiring a plurality of images of an object by capturing images of the object (inspection target object) by changing positions of illumination light source is disclosed.

In recent years, three-dimensional shape objects having faces applied with embossing become inspection target. If conventional technologies of arranging a plurality of light sources in the same plane are used to irradiate light onto to the three-dimensional shape objects having faces applied with embossing, the side face and the upper face of the three-dimensional shape objects cannot be simultaneously illuminated.

Further, if the surface of the object to be inspected (inspection target object) is applied with embossing, regular reflection lights in different directions, and thereby inspection images suitable for the inspection work cannot be captured and obtained.

SUMMARY

As one aspect of the present disclosure, an inspection system for inspecting an inspection target using an inspection target image is devised. The inspection system includes a first lighting device configured to irradiate light onto the inspection target from a given direction; a second lighting device, provided between the inspection target and the first lighting device, configured to irradiate light onto the inspection target from an oblique direction with respect to the given direction; an image capture device provided at a position opposite to a position of the inspection target with respect to the first lighting device and the second lighting device in the given direction, the image capture device, the first lighting device, the second lighting device, and the inspection target being aligned along the given direction; and circuitry configured to acquire an image of the inspection target, captured by the image capture device with the light having been irradiated onto the inspection target from the first lighting device, as a first inspection target image of the inspection target; and acquire an image of the inspection target, captured by the image capture device with the light having been irradiated onto the inspection target from the second lighting device, as a second inspection target image of the inspection target, wherein an inspection of the inspection target is performed based on the first inspection target image and the second inspection target image of the inspection target.

As another aspect of the present disclosure, an inspection apparatus for inspecting an inspection target using an inspection target image is devised. The inspection apparatus includes a first lighting device configured to irradiate light onto the inspection target from a given direction; a second lighting device, provided between the inspection target and the first lighting device, configured to irradiate light onto the inspection target from an oblique direction with respect to the given direction; and an image capture device, provided at a position opposite to a position of the inspection target with respect to the first lighting device and the second lighting device in the given direction, configured to capture an image of the inspection target, the image capture device, the first lighting device, the second lighting device, and the inspection target being aligned along the given direction.

As another aspect of the present disclosure, a method of inspecting an inspection target using an inspection target image is devised. The method includes irradiating light onto the inspection target using a first lighting device from a given direction; irradiating light onto the inspection target using a second lighting device from an oblique direction with respect to the given direction, the second lighting device being provided between the inspection target and the first lighting device, an image capture device provided at a position opposite to a position of the inspection target with respect to the first lighting device and the second lighting device in the given direction, the image capture device, the first lighting device, the second lighting device, and the inspection target being aligned along the given direction; acquiring an image of the inspection target, captured by the image capture device with the light having been irradiated onto the inspection target from the first lighting device, as a first inspection target image of the inspection target; acquiring an image of the inspection target, captured by the image capture device with the light having been irradiated onto the inspection target from the second lighting device, as a second inspection target image of the inspection target; and inspecting the inspection target based on the first inspection target image and the second inspection target image of the inspection target.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 12 is a flowchart illustrating a sequence of image synthesis processing; and FIG. 13 illustrates an example of diagram of the image synthesis processing.

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

Further, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an embodiment of an inspection system, an inspection apparatus, and an inspection method with reference to the accompanying drawings.

Figure 1:
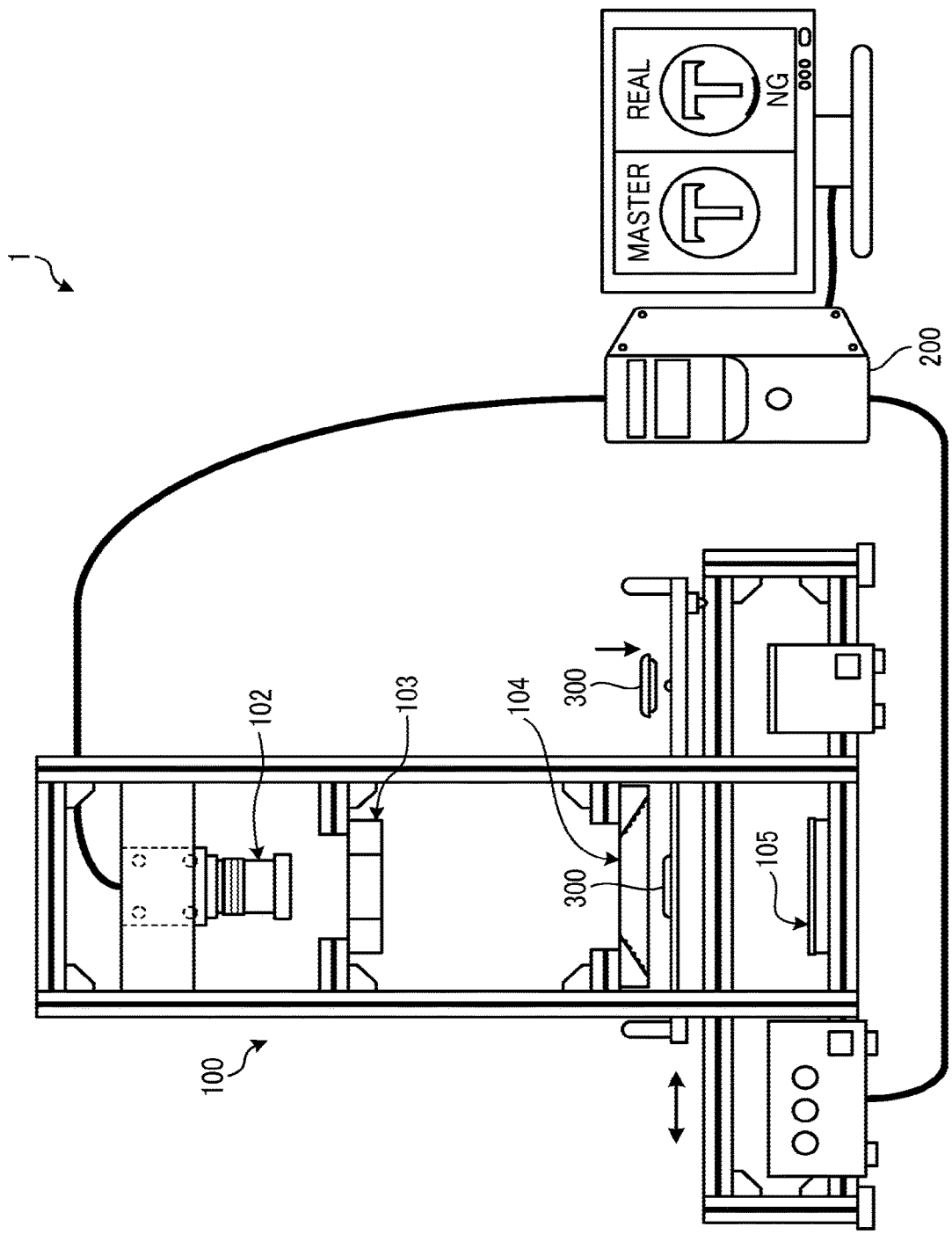
FIG. 1 is a diagram illustrating a configuration of an inspection system according to an embodiment.

FIG. 1 is a diagram illustrating a configuration of an inspection system 1 according to the embodiment. As illustrated in FIG. 1, the inspection system 1 includes, for example, an inspection apparatus 100, and an information processing apparatus 200. The information processing apparatus 200 is, for example, personal computer (PC) or server. The information processing apparatus 200 controls the inspection apparatus 100.

The inspection apparatus 100 irradiates light onto an object 300 (i.e., inspection target or inspection target object) to inspect given quality of the object 300 using the image capture device 102, such as printing quality on the object 300.

Figure 2:
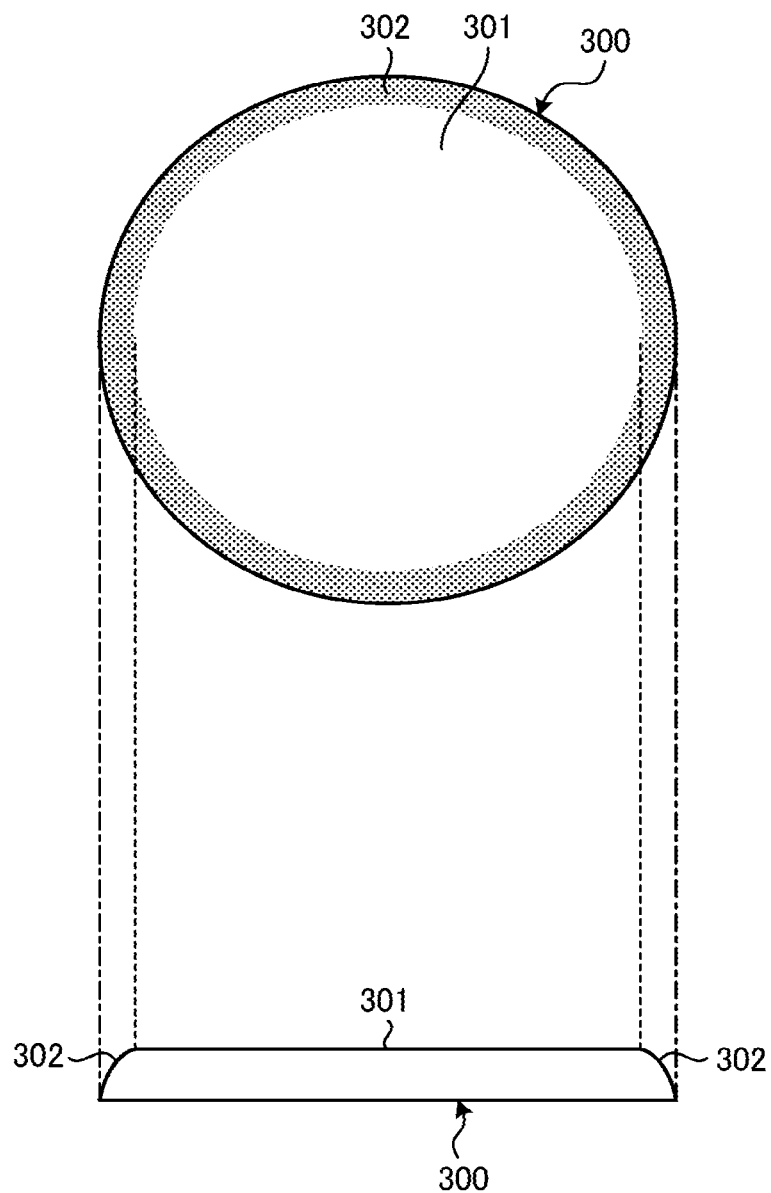
FIG. 2 is a diagram illustrating an object, which is an inspection target.

FIG. 2 is a diagram illustrating the object 300, which is an inspection target or inspection target object in this description. As illustrated in FIG. 2, the object 300 has, for example, a three-dimensional disk shape having given thickness. As illustrated in FIG. 2, the object 300 (i.e., inspection target) includes, for example, a flat face area 301 having a flat shape, and an edge face area 302 that is curved from the flat face area 301. Further, the flat face area 301 is embossed.

As to the object 300 (i.e., inspection target), the surface can be printed with various designs according to user preferences using printing apparatuses, such as ink jet printer. For example, the inspection apparatus 100 checks the printing quality of the design image printed on the object 300.

Further, the shape of the object 300 is not limited to the disk shape, but can be any shape, such as rectangular shape and elliptical shape. The object 300 may be any object, such as can badge, smartphone cover for covering smartphone, drop prevention grip mounted on smartphone, or the like.

Figure 3:
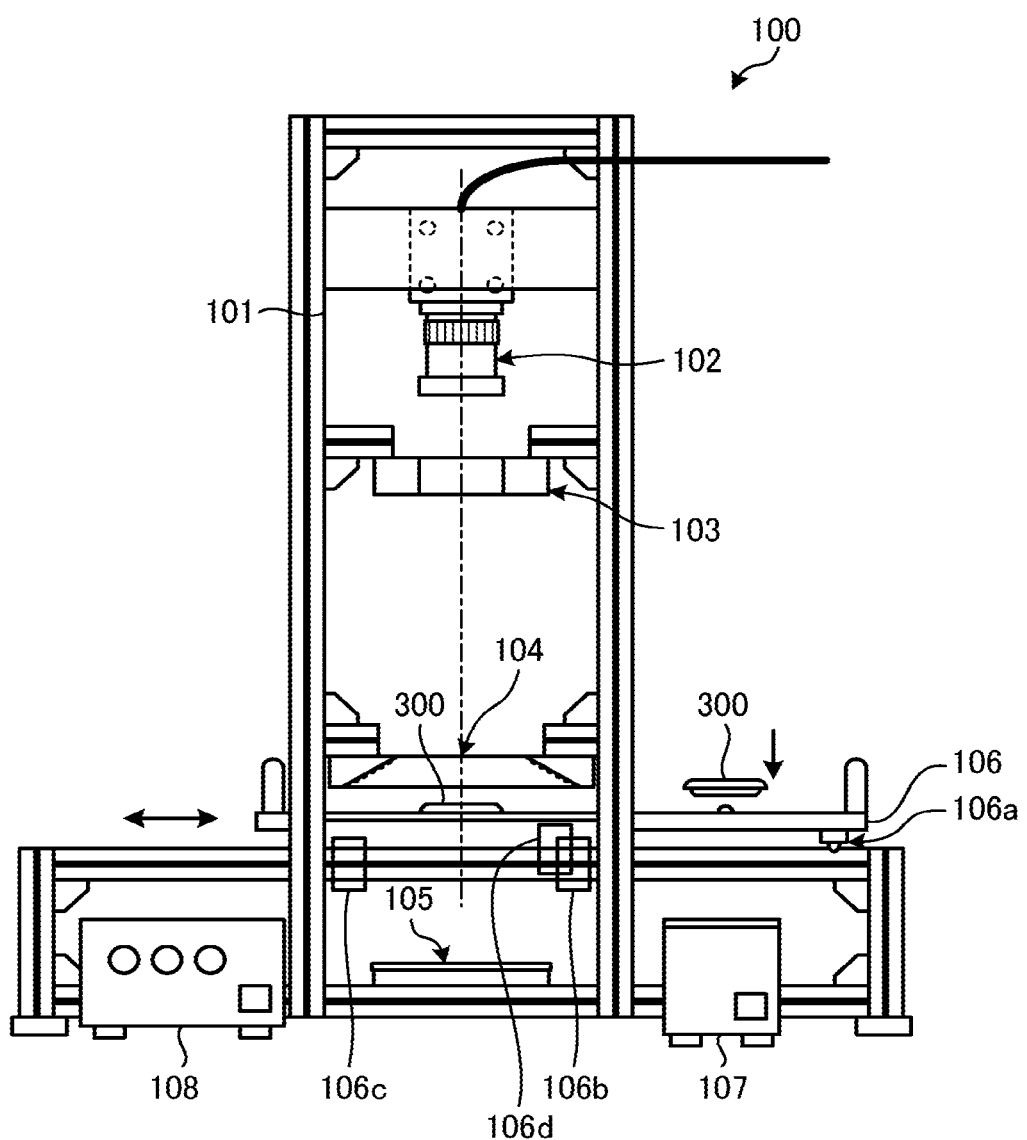
FIG. 3 is a diagram illustrating a configuration of an inspection apparatus.

FIG. 3 is a diagram illustrating a configuration of the inspection apparatus 100. As illustrated in FIG. 3, the inspection apparatus 100 includes a main frame 101 made of an aluminum frame. The main frame 101 is formed in a square-column shape.

As illustrated in FIG. 3, the main frame 101 includes, for example, an image capture device 102, a first encircled lighting device 103 (first lighting device), a second encircled lighting device 104 (second lighting device), and a backlight lighting device 105 (third lighting device) arranged along a given direction in this order, such as from the upper to lower sides along the vertical direction.

Further, the main frame 101 includes a slide stage 106 between the second encircled lighting device 104 and the backlight lighting device 105.

The image capture device 102 is a camera using, for example, complementary metal oxide semiconductor (CMOS), and outputting signals corresponding to the received light. Further, the image capture device 102 can be a camera using charge coupled device (CCD).

Figure 4:
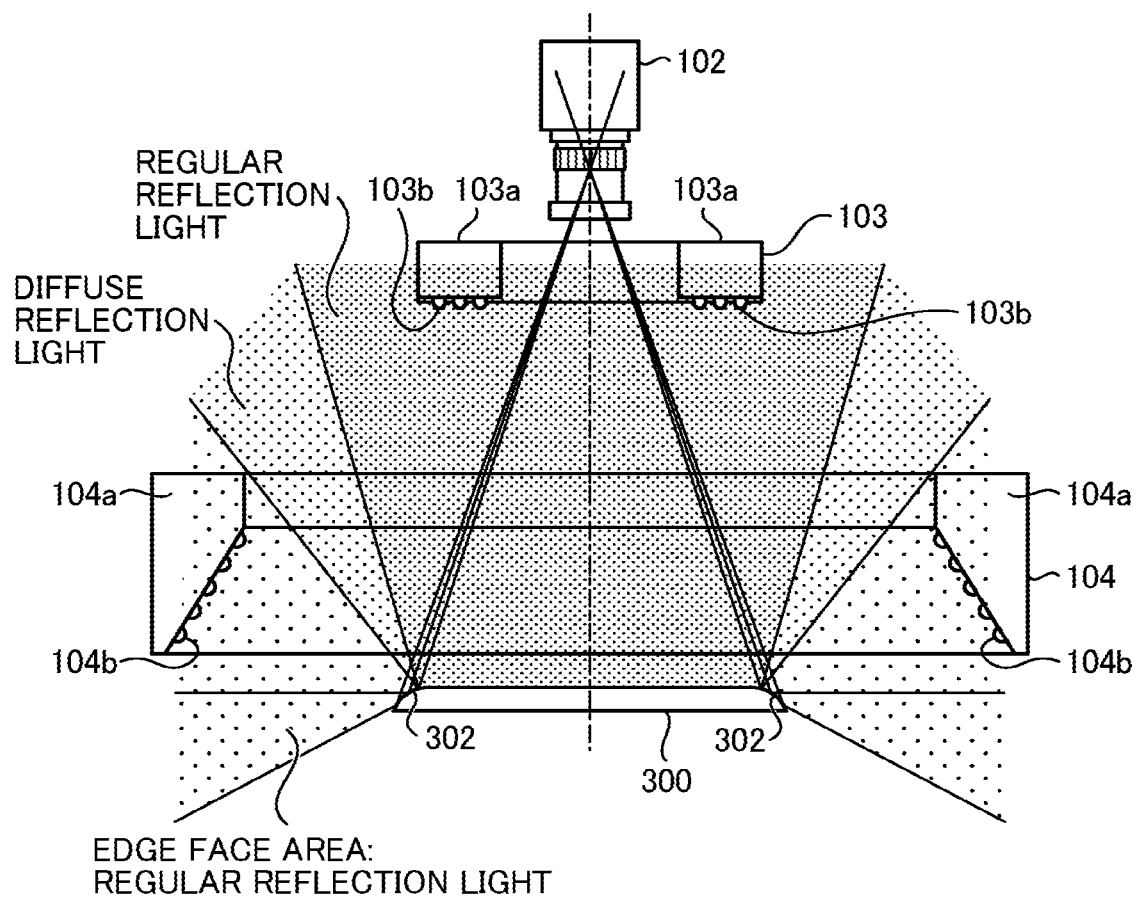
FIG. 4 is a diagram illustrating a layout configuration of each lighting device.

FIG. 4 is a diagram illustrating a layout configuration of each lighting device.

The first encircled lighting device 103 includes, for example, a body unit 103a having a ring shape, which is the first body unit in this description. Because the body unit 103a has the ring shape, the imaging of the object 300 by the image capture device 102 can be performed.

The first encircled lighting device 103 includes a plurality of light emitting diodes (LEDs) 103b, used as first light source, on the lower face of the body unit 103a having the ring shape. The plurality of LEDs 103b irradiate light onto the object 300 set and located at an imaging position of the image capture device 102 from the upper direction or vertical direction.

As illustrated in FIG. 4, the light coming from the first encircled lighting device 103 becomes regular reflection light and diffuse reflection light for the image capture device 102 at the flat face area 301 of the object 300. Further, the light coming from the first encircled lighting device 103 becomes diffuse reflection light for the image capture device 102 at the edge face area 302 of the object 300.

Further, the first encircled lighting device 103 employs the body unit 103a having the ring shape, but is not limited thereto. For example, the first encircled lighting device 103 can be configured by arranging a plurality of small-scale light sources in a ring shape, or by arranging a plurality (e.g., four) of small-scale light sources at four positions on a circumference of the body unit 103a when viewed from one direction.

The second encircled lighting device 104 includes, for example, a body unit 104a having a ring shape, which is the second body unit in this description. Because the body unit 104a has the ring shape, the imaging of the object 300 by the image capture device 102 can be performed.

The second encircled lighting device 104 includes, for example, a plurality of LEDs 104b, which are second light source, on the inner wall of the body unit 104a having the ring shape. The inner wall of the body unit 104a having the ring shape has a tapered shape such that the inner wall of the body unit extends from the upper side to the lower side. The plurality of LEDs 104b irradiate light onto the object 300 set and located at the imaging position of the image capture device 102 from an oblique direction (e.g., 30 degrees) with respect to the vertical direction.

As illustrated in FIG. 4, the light coming from the second encircled lighting device 104 becomes regular reflection light and diffuse reflection light for the image capture device 102 at the flat face area 301 of the object 300. Further, the light coming from the second encircled lighting device 104 becomes regular reflection light and diffuse reflection light for the image capture device 102 at the edge face area 302 of the object 300.

Further, the second encircled lighting device 104 employs the body unit 104a having the ring shape, but is not limited thereto. For example, the second encircled lighting device 104 can be configured by arranging a plurality of small-scale light sources in a ring shape, or by arranging a plurality (e.g., four) of small-scale light sources at four positions on a circumference of the body unit 104a when viewed from one direction.

Each of the first encircled lighting device 103 and the second encircled lighting device 104 may have a ring shape. Further, the shape of the encircled lighting device can be circular, elliptical (see FIG. 5A), or rectangular (see FIG. 5B).

Figure 5A:
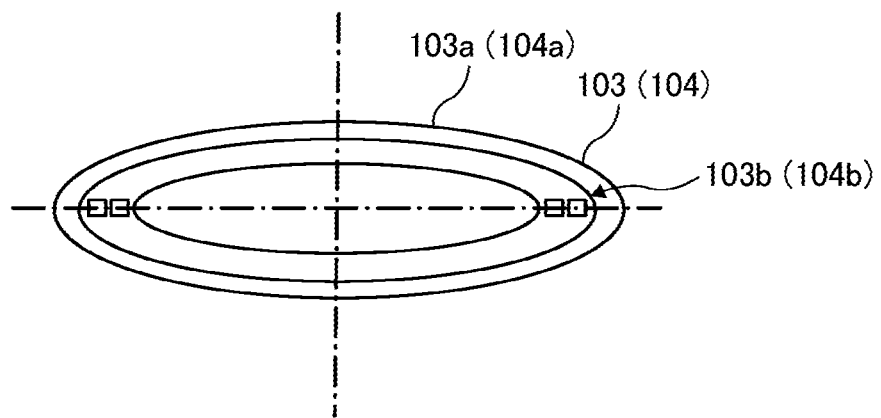
FIGS. 5A and 5B are examples of modification of a first encircled lighting device and a second encircled lighting device.
Figure 5B:
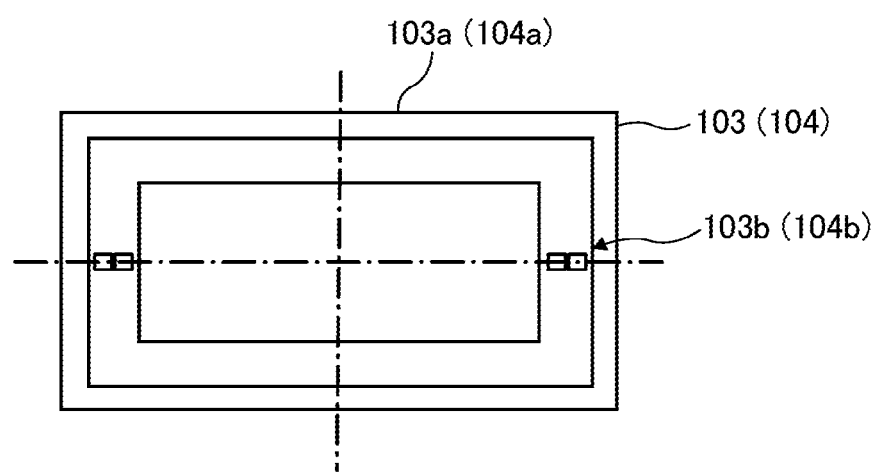

FIGS. 5A and 5B are examples of modification of the first encircled lighting device 103 and the second encircled lighting device 104. FIG. 5A is an example of elliptical shape, and FIG. 5B is an example of rectangular shape. As illustrated in FIG. 5A, the first encircled lighting device 103 (second encircled lighting device 104) may include the body unit 103a (104a) having an elliptical shape and opening, provided with a large number of LEDs 103b (104b). Further, as illustrated in FIG. 5B, the first encircled lighting device 103 (second encircled lighting device 104) may include the body unit 103a (104a) having a rectangular shape and an opening, provided with a large number of LEDs 103b (104b).

Further, the light coming from the backlight lighting device 105 is used to capture an image (i.e., silhouette image) indicating or representing a region (contour) of the object 300 using the image capture device 102.

In the embodiment, the first encircled lighting device 103 functions as one lighting device for imaging the edge face area 302 of the object 300 (capturing an image of the edge face area 302 of the object 300).

Further, the second encircled lighting device 104 functions as another lighting device for imaging the flat face area 301 of the object 300, which is inside the edge face area 302 (capturing an image of the flat face area 301 of the object 300).

Further, the backlight lighting device 105 functions as still another lighting device for recognizing a region (contour) of the object 300. The shape of backlight is not limited to a particular shape, but can be any shape having a size larger than the object 300.

In the embodiment, the image captured by the image capture device 102 by emitting the light from the first encircled lighting device 103 and the image captured by the image capture device 102 by emitting the light from the second encircled lighting device 104 are synthesized to acquire the entire image of the object 300.

Hereinafter, with reference to FIG. 6, a description is given of the slide stage 106. The slide stage 106 is a guide unit used for guiding the object 300 (i.e., inspection target) to the imaging position of the image capture device 102.

Figure 6:
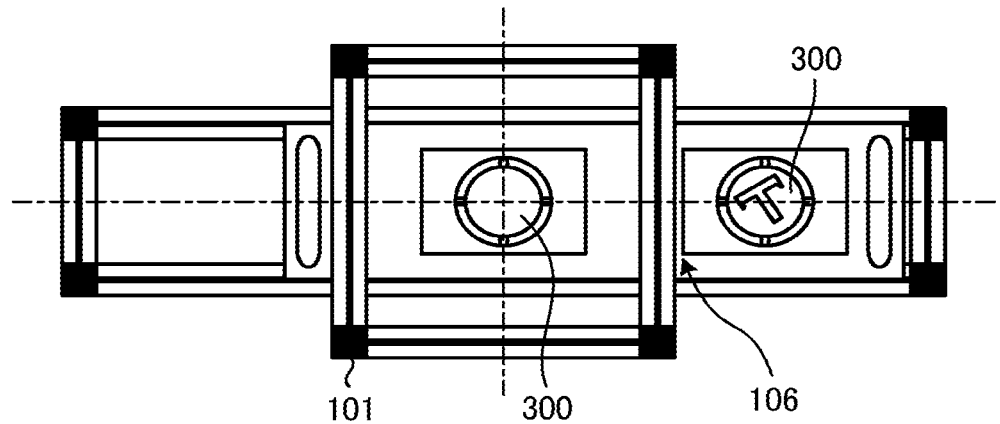
FIG. 6 is a view of a slide stage viewed from the upper direction.

FIG. 6 is a view of the slide stage 106 viewed from the upper direction. As illustrated in FIG. 6, the slide stage 106 can hold the object 300 at two positions (holding two objects). When the slide stage 106 moves to the right and left by using a slide mechanism, each of the object 300 moves to the imaging position of the image capture device 102 alternately.

As illustrated in FIG. 3, the slide stage 106 includes, for example, a ratchet mechanism 106a. The slide stage 106 fixes the object 300 at the imaging position of the image capture device 102 using the ratchet mechanism 106a.

As illustrated in FIG. 3, the slide stage 106 includes, for example, sensors 106b and 106c. The sensors 106b and 106c are non-contact sensors. When the object 300 on the right side is set and fixed at the imaging position of the image capture device 102, the sensor 106b is turned on. On the other hand, when the object 300 on the left side is set and fixed at the imaging position of the image capture device 102, the sensor 106c is turned on. The imaging is started using the sensor turning-on as a trigger.

Further, the movement of the slide stage 106 is absorbed by an absorber 106d (damper) provided on the left and right sides.

Figure 7:
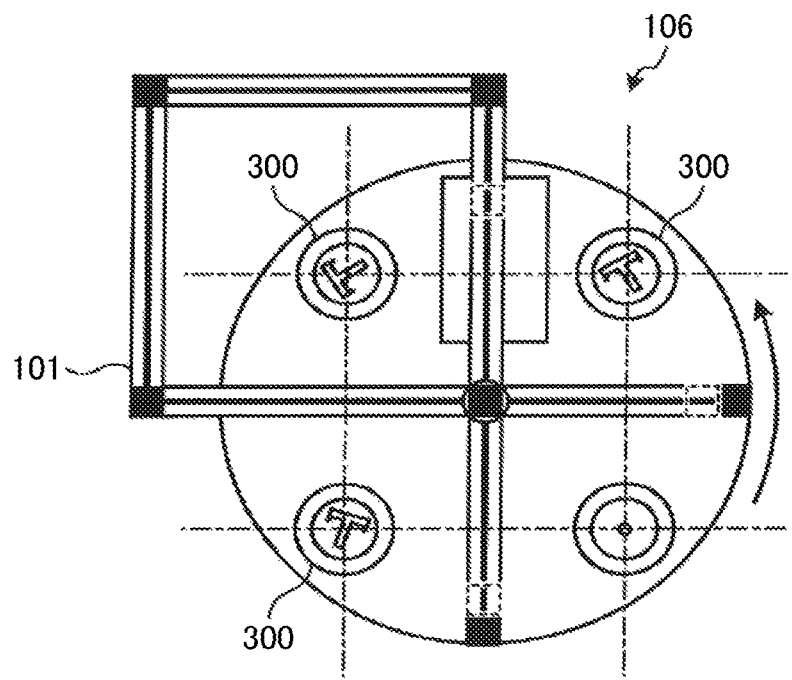
FIG. 7 is a view of a revolver type stage viewed from the upper direction.

Further, in the embodiment, the slide stage 106 is applied as the guide unit for guiding the object 300 (i.e., inspection target) to the imaging position of the image capture device 102, but is not limited thereto. For example, as illustrated in FIG. 7, the guide unit can be a revolver type stage for guiding the object 300 to the imaging position of the image capture device 102 by rotating the revolver type stage.

Hereinafter, with reference to FIG. 8, a description is given of electrical connection of the inspection system 1.

Figure 8:
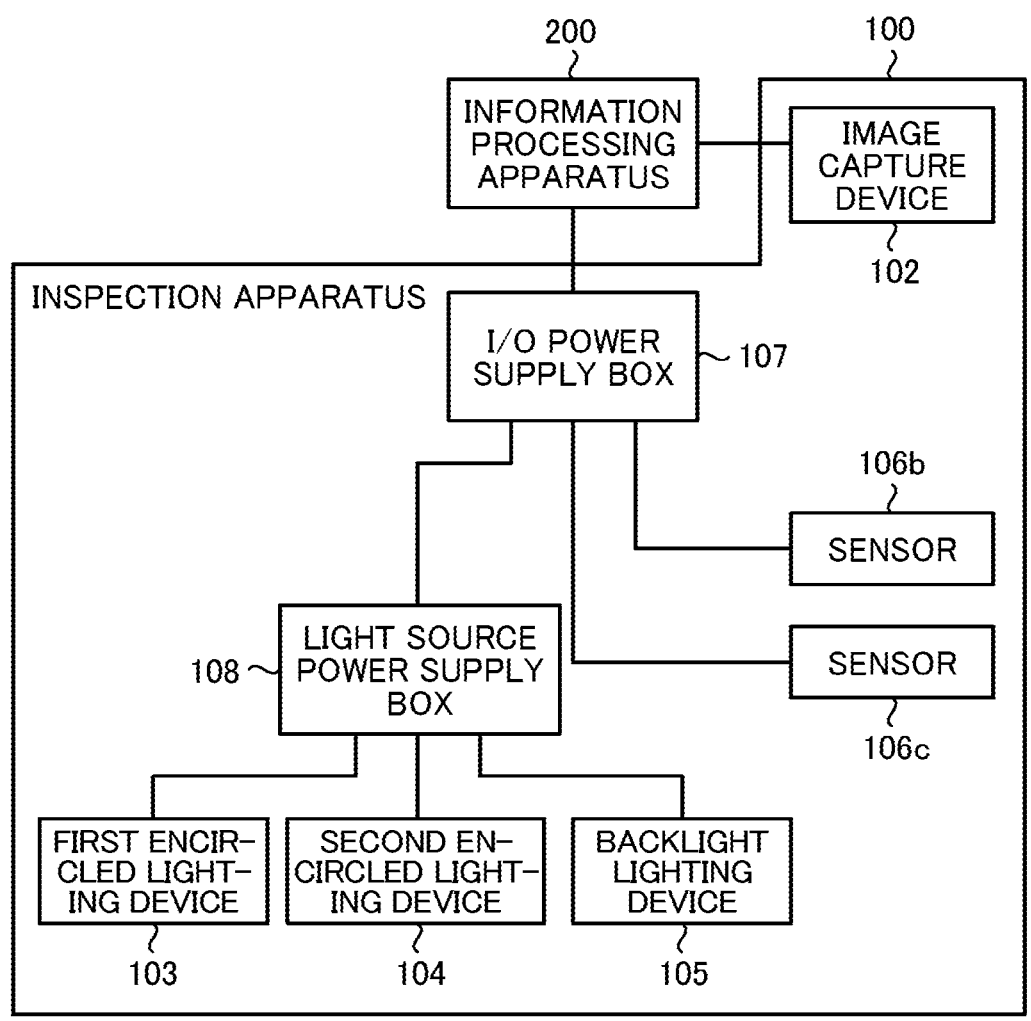
FIG. 8 is an example of configuration of hardware block diagram of electrical connection of an inspection system.

FIG. 8 is an example of configuration of hardware block diagram of electrical connection of the inspection system 1. As illustrated in FIG. 8, the inspection apparatus 100 includes, for example, an input/output (I/O) power supply box 107 and a light source power supply box 108. The information processing apparatus 200 is connected to the inspection apparatus 100 via the I/O power supply box 107.

The first encircled lighting device 103, the second encircled lighting device 104, and the backlight lighting device 105 are connected to the information processing apparatus 200 via the I/O power supply box 107 and the light source power supply box 108. The information processing apparatus 200 performs the LED lighting on-off control and the LED lighting power control of the first encircled lighting device 103, the second encircled lighting device 104, and the backlight lighting device 105.

The image capture device 102 is connected directly to the information processing apparatus 200, and controlled by the information processing apparatus 200. The sensors 106b and 106c of the second stage 106 are connected to the information processing apparatus 200 via the I/O power supply box 107. The information processing apparatus 200 performs detection of signals transmitted from the sensor 106b and 106c of the second stage 106. The imaging is started using the sensor turning-on as a trigger.

Hereinafter, with reference to FIG. 9, a description is given of hardware configuration of the information processing apparatus 200.

Figure 9:
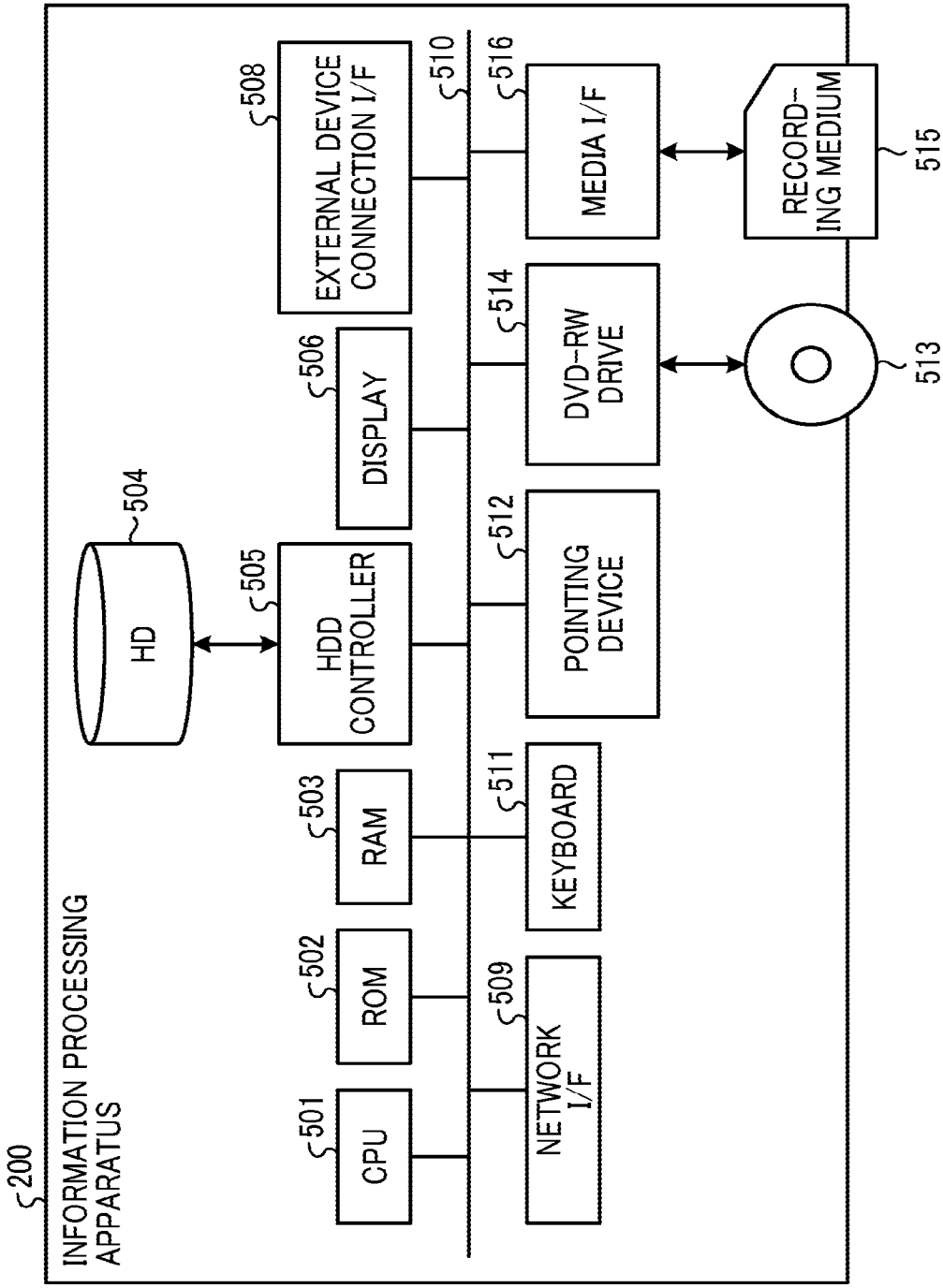
FIG. 9 is an example of configuration of hardware block diagram of an information processing apparatus.

FIG. 9 is an example of configuration of hardware block diagram of the information processing apparatus 200.

As illustrated in FIG. 9, the information processing apparatus 200 employs a computer. As illustrated in FIG. 9, the computer includes, for example, central processing unit (CPU) 501, read only memory (ROM) 502, random access memory (RAM) 503, hard disk (HD) 504, hard disk drive (HDD) controller 505, display 506, external device connection interface (I/F) 508, network interface (I/F) 509, bus line 510, keyboard 511, pointing device 512, digital versatile disk rewritable (DVD-RW) drive 514, and media interface (I/F) 516.

The CPU 501 controls the operation of the information processing apparatus 200 entirely. The ROM 502 stores programs, such as initial program loader (IPL) used for driving the CPU 501. The RAM 503 is used as a work area of the CPU 501.

The HD 504 stores various data, such as programs. The HDD controller 505 controls reading and writing of various data from or to the HD 504 under the control of the CPU 501.

The display 506 displays various information, such as cursor, menu, window, characters, or images.

The external device connection I/F 508 is an interface for connecting various external devices. The external devices are, for example, universal serial bus (USB) memory and printer.

The network I/F 509 is an interface for performing data communication using the communication network 100. The bus line 510 is an address bus and data bus for electrically connecting components, such as the CPU 501 illustrated in FIG. 9.

The keyboard 511 is a type of input unit or means including a plurality of keys for inputting characters, numbers, and various instructions. The pointing device 512 is a type of input unit or means used for selecting or performing various instructions, selecting process targets, moving a cursor, or the like.

The DVD-RW drive 514 controls reading and writing of various data from or to DVD-RW 513 used as an example of removable recording medium. The recording medium is not limited to DVD-RW, but may be DVD-R or the like. The media I/F 516 controls reading and writing of data from or to a recording medium 515, such as flash memory.

One or more programs executable by the information processing apparatus 200 of the embodiment are provided as a computer-readable recording medium, such as CD-ROM, a flexible disk (FD), CD-R, digital versatile disk (DVD), or the like using installable format or executable format.

Further, the one or more programs executable by the information processing apparatus 200 of the embodiment may be configured to be provided by storing the one or more programs on one or more computers connected to a network, such as the Internet, and downloading the one or more programs from the one or more computers via the network. Further, the one or more programs executable by the information processing apparatus 200 of the embodiment may be configured to be provided or distributed via the network, such as the Internet.

Hereinafter, with reference to FIG. 10, a description is given of processing performed by the information processing apparatus 200 by executing the programs by the CPU 501.

Figure 10:
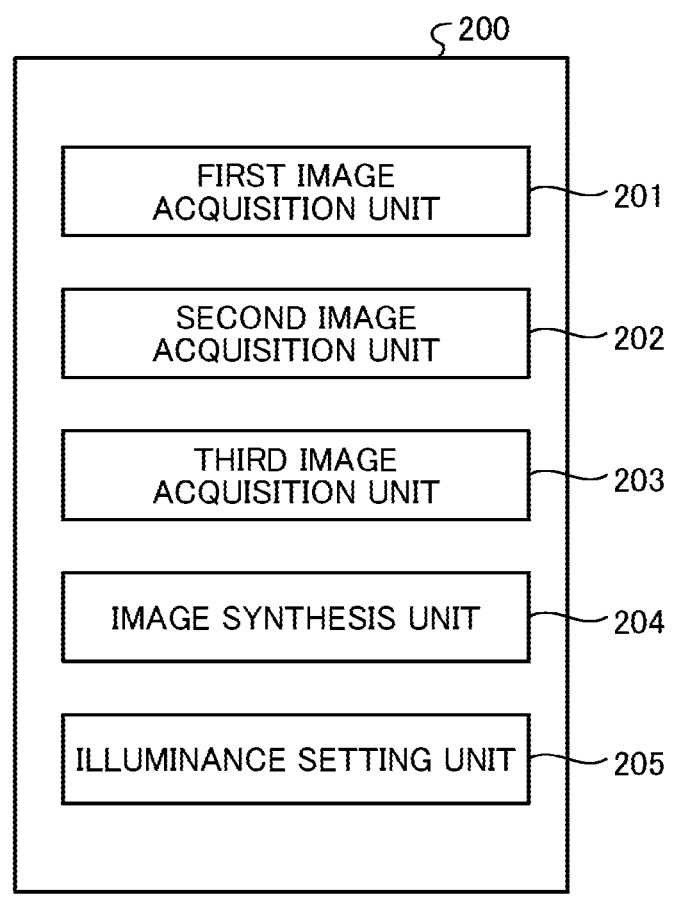
FIG. 10 is an example of configuration of functional block diagram of an information processing apparatus.

FIG. 10 is an example of configuration of functional block diagram of the information processing apparatus 200. As illustrated in FIG. 10, the CPU 501 of the information processing apparatus 200 implements first image acquisition unit 201, second image acquisition unit 202, third image acquisition unit 203, image synthesis unit 204, and illuminance setting unit 205.

The first image acquisition unit 201 obtains or acquires an image of the edge face area 302 of the object 300 as a first inspection target image of the inspection target from the image (image obtained by diffuse reflection light) captured by the image capture device 102 by irradiating the light using the first encircled lighting device 103.

The second image acquisition unit 202 obtains or acquires an image of the flat face area 301, excluding the edge face area 302 of the object 300, as a second inspection target image of the inspection target from the image (image obtained by regular reflection light) captured by the image capture device 102 by irradiating the light using the second encircled lighting device 104.

The third image acquisition unit 203 acquires an image indicating or representing a region (contour) of the object 300 from the image (i.e., silhouette image) captured by the image capture device 102 by irradiating the light using the backlight lighting device 105.

The image synthesis unit 204 synthesizes the image of the edge face area 302 of the object 300, the image of the flat face area 301 of the object 300, and the image indicating or representing the region (contour) the object 300 as a synthesized image to be used as the inspection image. Further, the image synthesis unit 204 may synthesize the image of the edge face area 302 of the object 300 and the image of the flat face area 301 of the object 300 as the synthesized image to be used as the inspection image. Further, the order of emitting or irradiating light from the backlight lighting device 105, the first encircled lighting device 103, and the second encircled lighting device 104 for capturing images is not limited to a specific order.

The illuminance setting unit 205 sets an illuminance level of the first encircled lighting device 103 and an illuminance level of the second encircled lighting device 104.

Hereinafter, with reference to FIG. 11, a description is given of processing performed by the information processing apparatus 200 according to the embodiment.

At first, a description is given of the illuminance setting processing of the two lighting devices such as the first encircled lighting device 103 and the second encircled lighting device 104 by the CPU 501 of the information processing apparatus 200. FIG. 11 is a flowchart illustrating a sequence of the illuminance setting process.

Further, as to the illuminance setting processing, it is assumed that the object 300 has the flat face area 301 and the edge face area 302 having the same color (e.g., white).

Figure 11:
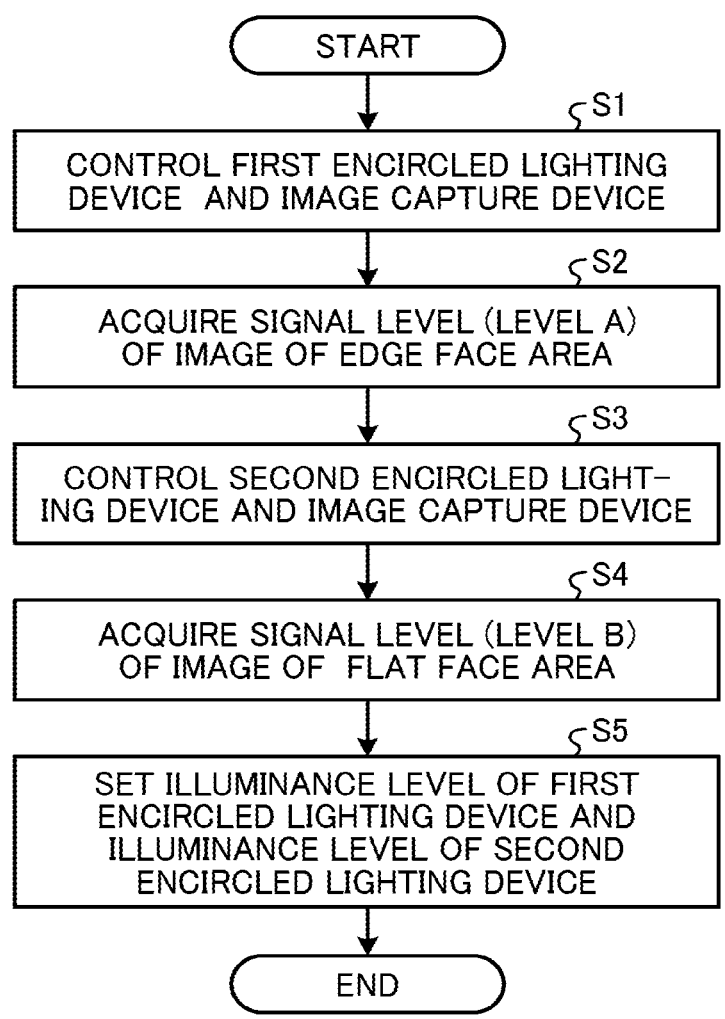
FIG. 11 is a flowchart illustrating a sequence of illuminance setting process.

As illustrated in FIG. 11, the illuminance setting unit 205 controls the first encircled lighting device 103 and the image capture device 102 (step S1).

Then, the illuminance setting unit 205 acquires a signal level (level A) of an image of the edge face area 302 captured by the image capture device 102 using the light emitted or irradiated by the first encircled lighting device 103 (step S2).

Then, the illuminance setting unit 205 controls the second encircled lighting device 104 and the image capture device 102 (step S3).

Then, the illuminance setting unit 205 acquires a signal level (level B) of an image of the flat face area 301 captured by the image capture device 102 using the light emitted or irradiated by the second encircled lighting device 104 (step S4).

Then, the illuminance setting unit 205 sets an illuminance level of the first encircled lighting device 103 and an illuminance level of the second encircled lighting device 104 so that the level A acquired in step S2 and the level B acquired in step S4 becomes the same level (step S5). For example, the illuminance setting unit 205 calculates a correction coefficient (a ratio of level A and level B) of the captured image signal so that the level A acquired in step S2 and the level B acquired in step S4 becomes the same level. The correction coefficient is used to correct the image captured by using the light emitted or irradiated by the second encircled lighting device 104 at the time of the actual inspection work.

In the embodiment, the illuminance setting processing of the two lighting devices such as the first encircled lighting device 103 and the second encircled lighting device 104 is described, but is not limited thereto. For example, the focus adjustment of the image capture device 102 can be also performed. Further, in addition to the illuminance setting and the focus adjustment, the shutter speed of the image capture device 102 can be adjusted and set.

Hereinafter, with reference to FIGS. 12 and 13, a description is given of the image synthesis processing by the CPU 501 of the information processing apparatus 200. FIG. 12 is a flowchart illustrating a sequence of image synthesis processing. FIG. 13 illustrates an example of diagram of the image synthesis processing.

As illustrated in FIG. 12, the third image acquisition unit 203 controls the backlight lighting device 105 and the image capture device 102 (step S11).

Then, the third image acquisition unit 203 recognizes a region (contour) of the object 300 (i.e., inspection target) from an image (i.e., silhouette image) captured by illuminating the object 300 using the light emitted or irradiated by the backlight lighting device 105 (step S12). The imaging is started using the sensor turning-on as a trigger. In response to completing the imaging or image capturing, each lighting device is turned off.

More specifically, in step S12, the third image acquisition unit 203 performs various processing, such as measurement of setting position (x, y) of the object 300, calculation of circular size of the object 300, determination of background image region of the object 300, and determination of setting error of the object 300.

Then, the first image acquisition unit 201 controls the first encircled lighting device 103 and the image capture device 102 (step S13).

Then, the first image acquisition unit 201 acquires an image of the edge face area 302 of the object 300 from the image (image obtained by diffuse reflection light) captured by illuminating the object 300 using the light emitted or irradiated by the first encircled lighting device 103 (step S14).

More specifically, in step S13, the first image acquisition unit 201 obtains or acquires a plurality of images (e.g., four images) capturing the object 300 (images obtained by diffuse reflection light).

Then, in step S14, the first image acquisition unit 201 performs the image averaging processing on the four captured images (images obtained by diffuse reflection lights), and then records and stores the image of the edge face area 302 of the object 300. The number of the captured image of the edge face area 302 of the object 300 can be one image. However, if the plurality of images (e.g., four images) is captured and then the image averaging processing is performed, the signal-to-noise (S/N) ratio can be increased.

Then, the second image acquisition unit 202 controls the second encircled lighting device 104 and the image capture device 102 (step S15).

Then, the second image acquisition unit 202 acquires an image of the flat face area 301 of the object 300 from the image (image obtained by regular reflection light) captured by illuminating the object 300 using the light emitted or irradiated by the second encircled lighting device 104 (step S16).

More specifically, in step S15, the second image acquisition unit 202 obtains or acquires a plurality of images (e.g., four images) capturing the object 300 (images obtained by regular reflection light).

Then, in step S16, the second image acquisition unit 202 performs the image averaging processing on the four captured images (images obtained by regular reflection light), and then records and stores the image of the flat face area 301 of the object 300. The number of the captured image of the flat face area 301 of the object 300 can be one image. However, if the plurality of images (e.g., four images) is captured and then the image averaging processing is performed, the signal-to-noise (S/N) ratio can be increased.

Further, the processing order of steps S13 to S16 is not limited to the sequence illustrated in the flowchart of FIG. 12. For example, after the second image acquisition unit 202 controls the second encircled lighting device 104 and the image capture device 102 (step S15), and then acquires or obtains the image of the flat face area 301 of the object 300 (step S16), the first image acquisition unit 201 controls the first encircled lighting device 103 and the image capture device 102 (step S13), and then acquires or obtains the image of the edge face area 302 of the object 300 (step S14). Further, the order of emitting or irradiating light from the backlight lighting device 105, the first encircled lighting device 103, and the second encircled lighting device 104 for capturing images is not limited to a specific order. In response to completing the imaging or image capturing, each lighting device is turned off.

Then, the image synthesis unit 204 synthesizes or merges the image of region (contour) of the object 300 acquired in step S12, the image of the edge face area 302 of the object 300 acquired in step S14, and the image of the flat face area 301 of the object 300 acquired in step S16 (step S17).

In the image synthesis processing of step S17, the image synthesis unit 204 performs various processing, such as x-y axis center pattern matching, rotation angle acquisition, x-y center affine conversion, and re-sampling. Further, in the image synthesis processing of step S17, the image synthesis unit 204 also performs gradation correction to apply the gradation correction to the synthesized image as illustrated in FIG. 13.

Then, the synthesized image generated as described above is used as the inspection target image of the object 300 (i.e., inspection target). For example, the inspection target image is compared with a master image for inspecting the printing quality on the object 300 as illustrated in FIG. 13. Then, the inspection result of the object 300 can be stored in the information processing apparatus 200, and displayed on a monitor. Further, the inspection result can be transmitted any terminal, such as smartphone and tablet, in addition to the information processing apparatus 200.

As to the above described embodiment, even if the object 300 (i.e., inspection target) has a three-dimensional shape and has a face applied with embossing, and thereby reflecting regular reflection lights in different directions, an inspection image that can be used for an appropriate image inspection can be created or generated.

Further, even if design patterns (e.g., printing patterns) on the object 300 (i.e., inspection target) become greater by performing the on-demand printing or variable printing, the inspection work can be performed efficiently by reducing the burden on the inspector.

As to the above described embodiment, even if an object to be inspected (inspection target object) has a given three-dimensional shape and has a given face applied with given processing, such as embossing, and thereby reflecting regular reflection lights in different directions, an inspection image that can be used for an appropriate image inspection can be created or generated.

Further, each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

The apparatuses and devices described in the embodiment merely shows one example of multiple computing environment that can implement the embodiment of this disclosure.

In one embodiment, the information processing apparatus 200 may include a plurality of computing devices as a server cluster. The plurality of computing devices are configured to communicate with each other via any type of communication link, including network or shared memory, and perform the processing disclosed in this description. Similarly, the information processing apparatus 200 may include a plurality of computing devices that are configured to communicate with each other.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

What is claimed is:

1. An inspection system for inspecting an inspection target, the inspection system comprising:
   a first light emitter to irradiate light onto the inspection target from a given direction;
   a second light emitter, provided between the inspection target and the first light emitter, to irradiate light onto the inspection target from an oblique direction with respect to the given direction;
   a camera provided at a position opposite to a position of the inspection target with respect to the first light emitter and the second light emitter in the given direction, wherein the camera, the first light emitter, the second light emitter and the inspection target are aligned along the given direction; and
   circuitry configured to
   acquire a first inspection target image, of an edge face area of the inspection target, captured by the camera with the light having been irradiated onto the inspection target from the first light emitter;
   acquire a second inspection target image, of a face of the inspection target other than the edge face area, captured by the camera with the light having been irradiated onto the inspection target from the second light emitter; and
   synthesize the first inspection target image and the second inspection target image to generate a synthesized image of the inspection target, wherein
   an inspection of the inspection target is performed based on the synthesized image.

2. The inspection system according to claim 1, further comprising:
   a third light emitter, provided at a position opposite to a position of the camera with respect to the inspection target, to irradiate light onto the inspection target, wherein
   the circuitry is further configured to acquire a third inspection target image, of a region of the inspection target, captured by the camera with the light having been irradiated onto the inspection target from the third light emitter, and
   the circuitry generates the synthesized image by synthesizing the first inspection target image, the second inspection target image and the third inspection target image.

3. The inspection system according to claim 2, wherein the circuitry is further configured to perform, in order, an image acquisition of the third inspection target image, an image acquisition of the first inspection target image and an image acquisition of the second inspection target image.

4. The inspection system according to claim 1, wherein the first light emitter includes a first body having a ring-shape, a first light source provided on a face of the first body facing the inspection target, and
   the first light source irradiates light onto the inspection target, set at an imaging position of the camera, from the given direction.

5. The inspection system according to claim 1, wherein the second light emitter includes a second having a ring shape and an inner wall face having a tapered shape, and a second light source provided on the inner wall face of the second body, and
   the second light source irradiates light onto the inspection target, set at the imaging position of the camera, from the oblique direction with respect to the given direction.

6. The inspection system according to claim 1, further comprising a guide that guides the inspection target to the imaging position of the camera.

7. The inspection system according to claim 1, wherein the circuitry is further configured to set an illuminance level of the first light emitter and an illuminance level of the second light emitter.

8. The inspection system according to claim 1, wherein the circuitry is further configured to perform a gradation correction to the synthesized image to create the inspection target image.

9. An inspection apparatus for inspecting an inspection target, the inspection apparatus comprising:
   a first light emitter to irradiate light onto the inspection target from a given direction;
   a second light emitter, provided between the inspection target and the first light emitter, to irradiate light onto the inspection target from an oblique direction with respect to the given direction; and
   a camera, provided at a position opposite to a position of the inspection target with respect to the first light emitter and the second light emitter in the given direction, configured to capture a first inspection target image, of an edge face area of the inspection target, with the light having been irradiated onto the inspection target from the first light emitter; and capture a second inspection target image, of a face of the inspection target other than the edge face area, with the light having been irradiated onto the inspection target from the second light emitter, wherein the camera, the first light emitter, the second light emitter, and the inspection target are aligned along the given direction, and an inspection of the inspection target is performed based on a synthesized image generated based the first inspection target image and the second inspection target image.

10. The inspection apparatus according to claim 9, further comprising a third light emitter provided at a position opposite to a position of the camera with respect to the inspection target, the third light emitter to irradiate light onto the inspection target.

11. The inspection apparatus according to claim 9, wherein the first light emitter includes a first body having a ring-shape, a first light source provided on a face of the first body facing the inspection target, and the first light source irradiates light onto the inspection target, set at an imaging position of the camera, from the given direction.

12. The inspection apparatus according to claim 9, wherein the second light emitter includes a second body having a ring shape and an inner wall face having a tapered shape, and a second light source provided on the inner wall face of the second body, and the second light source irradiates light onto the inspection target, set at the imaging position of the camera, from the oblique direction with respect to the given direction.

13. The inspection apparatus according to claim 9, further comprising a guide that guides the inspection target to the imaging position of the camera.

14. A method of inspecting an inspection target, the method comprising:

irradiating light onto the inspection target using a first light emitter from a given direction;

irradiating light onto the inspection target using a second light emitter from an oblique direction with respect to the given direction, wherein the second light emitter is provided between the inspection target and the first light emitter, a camera is provided at a position opposite to a position of the inspection target with respect to the first light emitter and the second light emitter in the given direction, and the camera, the first light emitter, the second light emitter, and the inspection target are aligned along the given direction;

acquiring a first inspection target image, of an edge face area of the inspection target, captured by the camera with the light having been irradiated onto the inspection target from the first light emitter;

acquiring a second inspection target image, of a face of the inspection target other than the edge face area, captured by the camera with the light having been irradiated onto the inspection target from the second light emitter;

synthesizing, by the camera, the first inspection target image and the second inspection target image to generate a synthesized image of the inspection target; and inspecting the inspection target based on the synthesized image.

* * * * *